(12) United States Patent
Ikeda

(10) Patent No.: US 9,811,738 B2
(45) Date of Patent: Nov. 7, 2017

(54) APPEARANCE PRESENTATION SYSTEM, METHOD, AND PROGRAM

(71) Applicant: NEC Corporation, Tokyo (JP)

(72) Inventor: Hiroo Ikeda, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 14/649,312

(22) PCT Filed: Nov. 29, 2013

(86) PCT No.: PCT/JP2013/007026
§ 371 (c)(1),
(2) Date: Jun. 3, 2015

(87) PCT Pub. No.: WO2014/087622
PCT Pub. Date: Jun. 12, 2014

(65) Prior Publication Data
US 2015/0317522 A1    Nov. 5, 2015

(30) Foreign Application Priority Data

Dec. 6, 2012 (JP) .................. 2012-267554

(51) Int. Cl.
*G06K 9/00* (2006.01)
*G06F 3/01* (2006.01)
(Continued)

(52) U.S. Cl.
CPC ......... *G06K 9/00771* (2013.01); *G06F 3/013* (2013.01); *G06K 9/0061* (2013.01);
(Continued)

(58) Field of Classification Search
CPC .... G06K 9/00771; G06K 9/0061; G06K 9/32; G06K 2209/21; G06K 2209/01;
(Continued)

(56) References Cited

U.S. PATENT DOCUMENTS

2005/0162274 A1* 7/2005 Shniberg ............ G06K 7/1095
340/572.1
2007/0268369 A1* 11/2007 Amano ................... H04N 7/18
348/207.99

(Continued)

FOREIGN PATENT DOCUMENTS

| JP | 11-266450 | 9/1999 |
| JP | 2009-239821 | 10/2009 |
| JP | 2012-155595 | 8/2012 |

OTHER PUBLICATIONS

International Search Report and Written Opinion of ISA dated Feb. 4, 2014 in corresponding PCT International Application.

*Primary Examiner* — Mekonnen Dagnew
(74) *Attorney, Agent, or Firm* — Finnegan, Henderson, Farabow, Garrett & Dunner, L.L.P.

(57) ABSTRACT

An appearance presentation system is provided. The appearance presentation system can present the appearance of an object to be monitored at a position that the user designates in an image such that the user can previously grasp the extent to which the image to be captured with a camera is suitable for an image recognition process. A display control unit 10 displays, on a display device, an image obtained by superimposing an object indicator indicating the object to be monitored on an image to be captured when the camera of which position and posture are determined shoots a predetermined region to be monitored. A position designation reception unit 4 receives the designation of the position of the object indicator in the image. An image generation unit 3 generates an image to be captured when the camera shoots a state in which the object to be monitored is placed at a position that is in the region to be monitored and that corresponds to the position designated in the image. Then, the display control unit 10 extracts a part corresponding to the object to be monitored from the image generated in the (Continued)

image generation unit 3, and displays the part on the display device.

20 Claims, 10 Drawing Sheets

(51) Int. Cl.
    *H04N 7/18*     (2006.01)
    *G06K 9/32*     (2006.01)
    *G06K 9/03*     (2006.01)
    *G06T 7/73*     (2017.01)

(52) U.S. Cl.
    CPC ............... *G06K 9/036* (2013.01); *G06K 9/32* (2013.01); *G06T 7/73* (2017.01); *H04N 7/18* (2013.01); *G06K 2207/1012* (2013.01); *G06K 2209/01* (2013.01); *G06K 2209/21* (2013.01); *G06T 2207/10004* (2013.01); *G06T 2207/30196* (2013.01); *G06T 2207/30232* (2013.01); *G06T 2207/30244* (2013.01)

(58) Field of Classification Search
    CPC ............ G06K 2207/1012; G06F 3/013; G06T 7/0042; G06T 2207/30232; G06T 2207/30244; G06T 2207/10004; G06T 2207/30196; H04N 7/18
    See application file for complete search history.

(56) References Cited

U.S. PATENT DOCUMENTS

| | | | |
|---|---|---|---|
| 2011/0090303 A1* | 4/2011 | Wu | G06K 9/00228 348/14.16 |
| 2012/0249837 A1* | 10/2012 | Chen | H04N 5/2625 348/239 |
| 2013/0103299 A1* | 4/2013 | Matsuda | G06F 17/00 701/300 |

* cited by examiner

APPEARANCE PRESENTATION SYSTEM, METHOD, AND PROGRAM

CROSS-REFERENCE TO RELATED PATENT APPLICATIONS

This application is a National Stage Entry of International Application No. PCT/JP2013/007026, filed Nov. 29, 2013, which claims priority from Japanese Patent Application No. 2012-267554, filed Dec. 6, 2012. The entire contents of the above-referenced applications are expressly incorporated herein by reference.

TECHNICAL FIELD

The present invention relates to an appearance presentation system, an appearance presentation method, and an appearance presentation program that present the user with how the object to be monitored is shown in an image that is to be captured with a camera.

BACKGROUND ART

PLT 1 discloses a technique for displaying the shooting range of a camera. The technique described in PLT 1 designates, for example, the position of the camera in the top view of a predetermined area displayed on the display device. Then, the technique displays, in the top view, a horizontal view onto which the shooting range of the camera is projected, and displays, in an elevation view, a vertical view that is the view of the camera in the plane perpendicular to the horizontal plane and including the optical axis of the camera. FIG. 13 is a schematic view of the horizontal and vertical views displayed by the technique described in PLT 1.

In the technique described in PLT 1, for example, when the position of the camera is designated in a top view 100, a camera indicator 101 indicating the camera is displayed in the top view 100. The user adjusts the height of the camera by dragging a camera indicator 111 displayed in an elevation view 107. When the position of the camera is designated, a calculated horizontal view 105 is displayed in the top view 100, and a vertical view 115 is displayed in the elevation view 107. The vertical view 115 includes an optical axis 110 of the camera. When an icon of a person is dragged and dropped on the top view 100, a person indicator 102 is displayed at the position at which the icon is dropped and a person indicator 112 is also displayed in the elevation view 107. Similarly, if the position at which a wall that is an obstacle to the camera exists is designated, a wall indicator 103 is displayed in the top view. Note that the person indicator in the top view 100 is denoted with the reference sign "102" and the person indicator in the elevation view 107 is denoted with the reference sign "112" in FIG. 13.

The technique described in PLT 1 presents the relationship between the view of the camera and a person, a wall or the like in a predetermined area by the display described above, and is used to adjust the position of the camera.

CITATION LIST

Patent Literature

PLT 1: JP 2009-239821 A

SUMMARY OF INVENTION

Technical Problem

An image of an object to be monitored (for example, a person) captured with a camera is sometimes used for an image recognition process. A detecting process for detecting the object to be monitored from the image, and an identifying process not only for detecting the object to be monitored from the image but also for identifying the object to be monitored are cited as examples of the image recognition process. However, the image recognition process is not limited to the examples. To perform such an image recognition process, the user preferably grasps the extent to which the image to be captured with the camera is suitable for the image recognition process in advance.

For example, when an image of the object to be monitored is captured with a low resolution, the image is not suitable for the image recognition process. For example, when an image of the object to be monitored is captured at an undesirable angle, the image is not suitable for the image recognition process. It is preferable for the user to grasp the suitability as described above before the user actually places and uses the camera.

The technique described in PLT 1 can display the person indicators 102 and 112 while displaying the horizontal view 105 in the top view 100 and the vertical view 115 in the elevation view 107 (see FIG. 13).

However, the technique described in PLT 1 merely displays a person indicator at the position that the user designates, and the user does not check how the person is shown in the image to be captured (in other words, how the person is seen in the image to be captured). Thus, the user fails to previously grasp the extent to which the image to be captured with the camera is suitable for the image recognition process when the user determines the position, posture, and the like of the camera. The appearance of the object to be monitored in the image varies depending on the position of the object to be monitored in the image captured with the camera of which position and posture is determined. Thus, the user preferably checks such a variation.

In light of the foregoing, an objective of the present invention is to provide an appearance presentation system, an appearance presentation method, and an appearance presentation program that can present the appearance of the object to be monitored at the position designated by the user in the image (in other words, how the object to be monitored is seen in the image) such that the user can previously grasp the extent to which the image to be captured with the camera is suitable for the image recognition process.

Solution to Problem

The appearance presentation system according to the present invention includes: a display control means configured to display, on a display device, an image obtained by superimposing an object indicator indicating an object to be monitored on an image to be captured when a camera of which position and posture are determined shoots a predetermined region to be monitored; a position designation reception means configured to receive a designation of a position of the object indicator in the image; and an image generation means configured to generate an image to be captured when the camera shoots a state in which the object to be monitored is placed at a position that is in the region to be monitored and that corresponds to the position designated in the image. The display control means extracts a part corresponding to the object to be monitored from the image generated in the image generation means, and displays the part on the display device.

The appearance presentation method according to the present invention includes: displaying, on a display device, an image obtained by superimposing an object indicator indicating an object to be monitored on an image to be captured when a camera of which position and posture are determined shoots a predetermined region to be monitored; receiving a designation of a position of the object indicator in the image; generating an image to be captured when the camera shoots a state in which the object to be monitored is placed at a position that is in the region to be monitored and that corresponds to the position designated in the image; and extracting a part corresponding to the object to be monitored from the generated image, and displaying the part on the display device.

The appearance presentation program according to the present invention causes a computer to execute a process. The process includes: a display control process for displaying, on a display device, an image obtained by superimposing an object indicator indicating an object to be monitored on an image to be captured when a camera of which position and posture are determined shoots a predetermined region to be monitored; a position designation reception process for receiving a designation of a position of the object indicator in the image; an image generation process for generating an image to be captured when the camera shoots a state in which the object to be monitored is placed at a position that is in the region to be monitored and that corresponds to the position designated in the image; and a user determination information display process for extracting a part corresponding to the object to be monitored from the image generated in the image generation process, and displaying the part on the display device.

Advantageous Effects of Invention

The present invention can present the appearance of the object to be monitored at the position designated by the user in the image such that the user can previously grasp the extent to which the image to be captured with the camera is suitable for an image recognition process.

DESCRIPTION OF EMBODIMENTS

An exemplary embodiment of the present invention will be described hereinafter with reference to the appended drawings.

Figure 1:
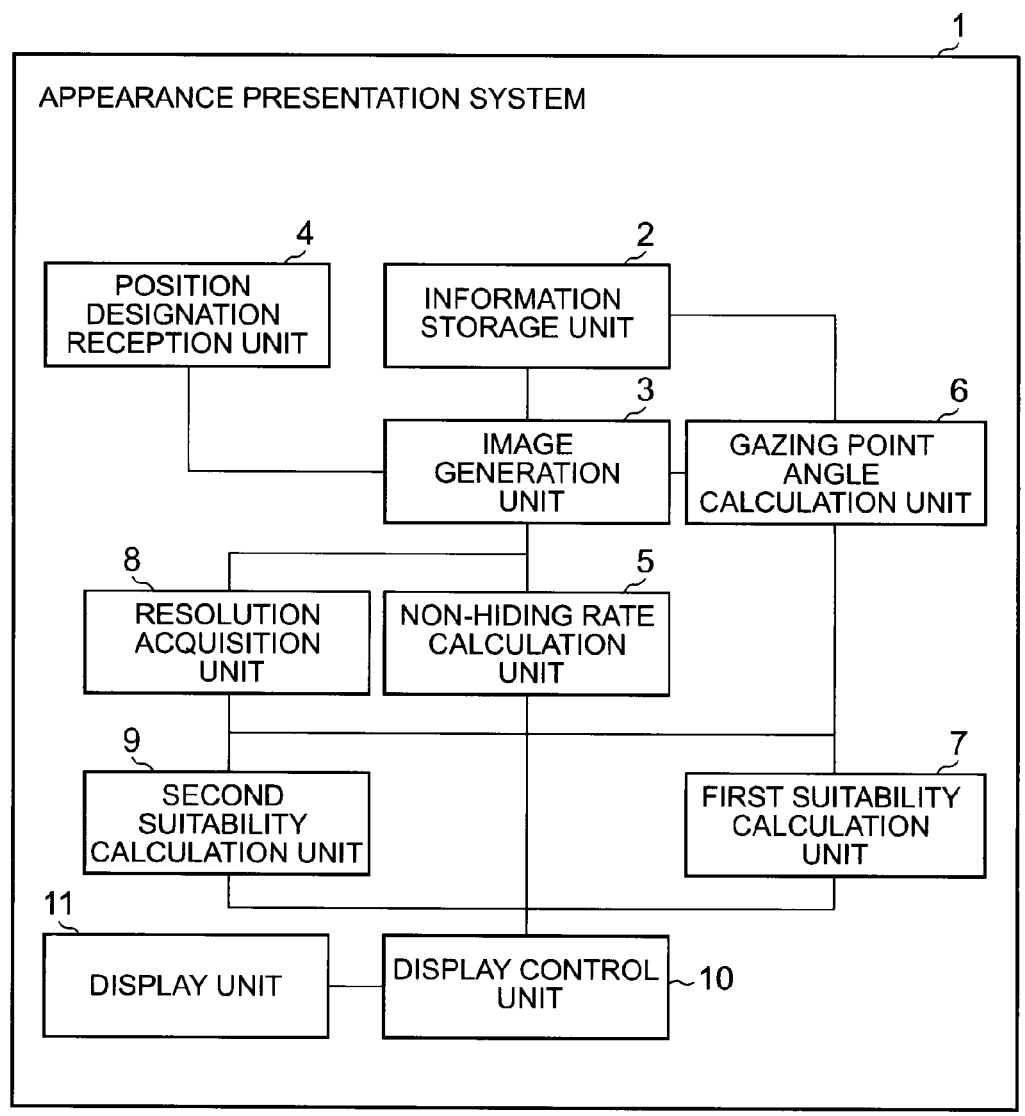
FIG. 1 It depicts a block diagram of an exemplary configuration of an appearance presentation system according to the present invention.

FIG. 1 is a block diagram of an exemplary configuration of an appearance presentation system according to the present invention. An appearance presentation system 1 in the present exemplary embodiment includes an information storage unit 2, an image generation unit 3, a position designation reception unit 4, a non-hiding rate calculation unit 5, a gazing point angle calculation unit 6, a first suitability calculation unit 7, a resolution acquisition unit 8, a second suitability calculation unit 9, a display control unit 10, and a display unit 11. Although being omitted in FIG. 1, the appearance presentation system 1 includes also a pointing device such as a mouse.

The display unit 11 is a display device configured to display an image.

The information storage unit 2 is a storage device configured to storage the camera parameters, the screen size of the camera, the information indicating the region to be monitored, the information about the object to be monitored that is to be captured with the camera, the information about an obstacle placed in the region to be monitored, a resolution evaluating function, and a gazing point angle evaluating function.

The camera parameters are the parameters of the camera to be checked when the appearance of the object to be monitored in the image to be captured is checked. The camera parameters include the information, for example, about the position, posture, angle of view, focal length, and lens deformation of the camera.

The region to be monitored is a region in a real space of which image is to be captured with the camera and is to be processed in the image recognition process in the captured image. The information storage unit 2 stores the range of the region to be monitored.

The information about the object to be monitored includes, for example, the shape and size of the object to be monitored.

The information about the obstacle includes, for example, the position, shape, and size of the obstacle.

Figure 2:
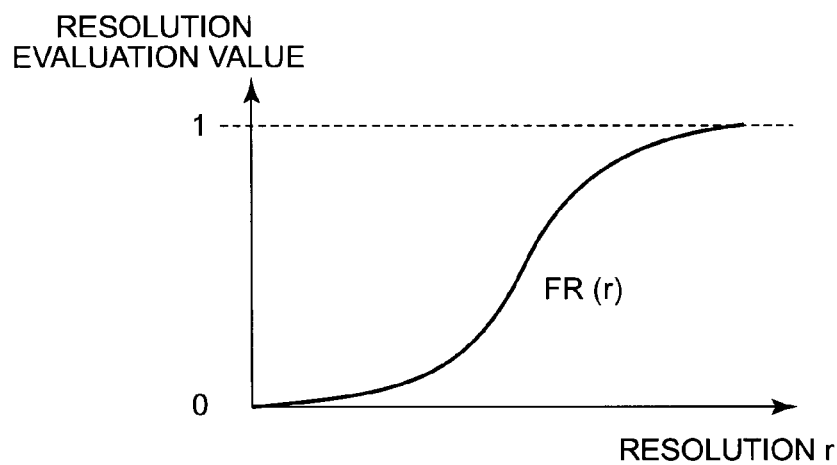
FIG. 2 It depicts a graph of an exemplary resolution evaluating function.

The resolution evaluating function converts the resolution of the object to be monitored in the image into a resolution evaluation value indicating the suitability for the image recognition process. FIG. 2 is a graph of an exemplary resolution evaluating function. The more suitable the resolution is for the image recognition process, the more the resolution evaluation value approaches one. The less suitable the resolution is for the image recognition process, the more the resolution evaluation value approaches zero. In general, the higher the resolution is, the sharper the image of the object to be monitored is. Thus, the image is suitable for the image recognition process. The resolution evaluating function is set in accordance with the image recognition process to be performed. The resolution described herein may be the pixel area of the object to be monitored in the image, or may be the pixel area of the rectangles surrounding the object to be monitored in the image. Alternatively, the resolution may be the vertical pixel size of the rectangles surrounding the object to be monitored in the image, or may be the horizontal pixel size of the rectangles surrounding the object to be monitored in the image. The resolution evaluating function including a resolution r as a variable is denoted with FR(r).

Figure 3:
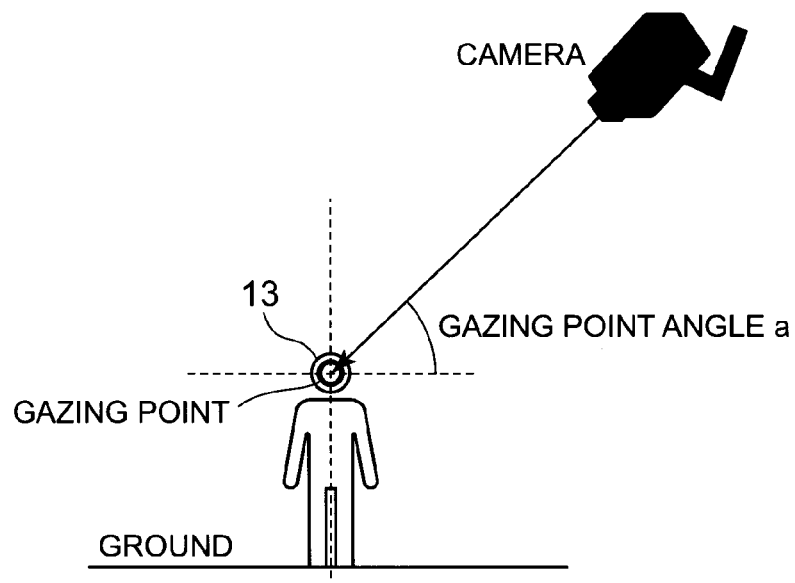
FIG. 3 It depicts an explanatory diagram of a gazing point angle at the object to be monitored.

The gazing point angle evaluating function converts the angle of the gazing point at the object to be monitored into a gazing point angle evaluation value indicating the suitability for the image recognition process. FIG. 3 is an explanatory diagram of the gazing point angle at the object to be monitored. FIG. 3 illustrates an example in which the object to be monitored is the head of a person. The gazing point angle at an object 13 to be monitored is the angle between a straight line connecting the position of the camera with the position of the gazing point in the object 13 to be monitored, and the ground. Herein, the position of the gazing point in the object 13 to be monitored is an arbitrary point in the object 13 to be monitored and indicates a point to be noticed in the object 13 to be monitored. For example, the center of gravity of the object 13 to be monitored or the center of the central axis may be placed at the gazing point. Note that, although FIG. 3 illustrates, as an example, that the gazing point is placed on the optical axis of the camera, the optical axis of the camera may be misaligned from the gazing point. Regardless of the alignment between the optical axis of the camera and the gazing point, the gazing point angle can be determined as long as the position of the camera and the position of the gazing point in the object 13 to be monitored are determined.

Figure 4:
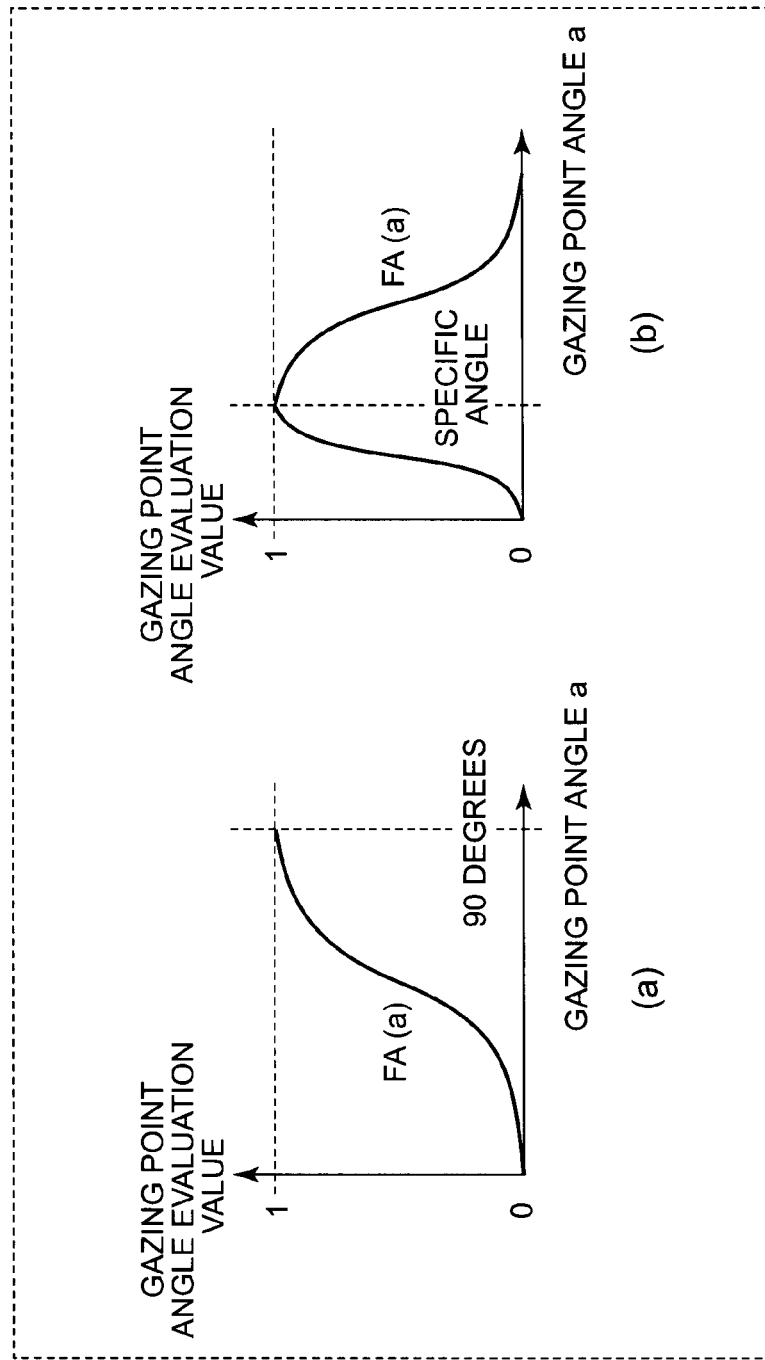
FIG. 4 It depicts graphs of exemplary gazing point angle evaluating functions.

FIG. 4 is graphs of exemplary gazing point angle evaluating functions. For example, when the position of the object to be monitored is estimated in an image recognition process, it is preferable that the overlap of the objects to be monitored or the overlap of the object to be monitored and the obstacle is smaller. In such a case, as illustrated in FIG. 4(a), the gazing point angle evaluating function may be determined such as the more the gazing point angle approaches 90° (in other words, the closer to the position immediately above the object the position at which the image is captured approaches), the more the gazing point angle evaluation value approaches one while the more the gazing point angle approaches 0°, the more the gazing point angle evaluation value approaches zero. Alternatively, when an object detecting process or an object identifying process is performed in an image recognition process, it is preferable that the gazing point angle is close to a specific angle. In such a case, as illustrated in FIG. 4(b), the gazing point angle evaluating function may be determined such that the more the angle of the gazing point approaches the specific angle, the more highly the gazing point angle evaluation value increases. The gazing point angle evaluating function including a gazing point angle a as a variable is denoted with FA(a).

An example in which both of the resolution evaluation value and the gazing point angle evaluation value are in the range of zero to one will be described in the present exemplary embodiment.

The image generation unit 3 generates an image to be captured when a camera in accordance with the camera parameters shoots a state in which the obstacle indicated in the information about the obstacle is placed in the region to be monitored. The image generation unit 3 generates the image, for example, using computer graphics (CG). The image is not actually captured with the camera. The image is obtained by a simulation of shooting of the space in which an obstacle exists in the region to be monitored with the camera in accordance with the camera parameters. However, it is not necessary to store the information about the obstacle in the information storage unit 2 when no obstacle exists in the region to be monitored of the real space. In such a case, the image generation unit 3 generates an image to be captured when the camera shoots the space in which no obstacle exists in the region to be monitored. Subsequently, the image generation unit 3 superimposes an object indicator indicating the object to be monitored on the generated image. The object indicator may be superimposed, for example, on a predetermined initial position. As to be described below, the object indicator moves in the image in accordance with the user operation. The image on which the object indicator is superimposed is referred to as a user operation image. In the present example, an object indicator is displayed on the user operation image.

Figure 5:
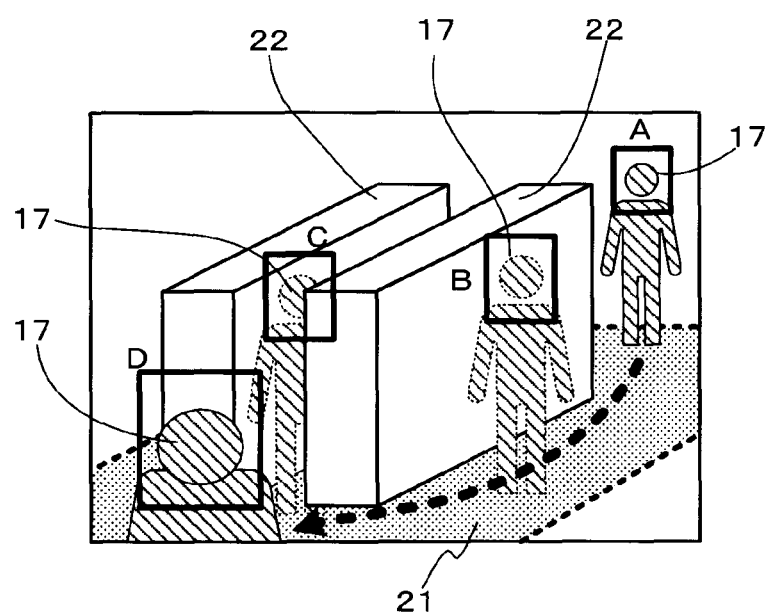
FIG. 5 It depicts an explanatory diagram of an exemplary user operation image.

The display control unit 10 displays the user operation image on the display unit 11. FIG. 5 is an explanatory diagram of an exemplary user operation image. FIG. 5 illustrates a plurality of object indicators 17. The plurality of object indicators 17 indicates that an object indicator 17 moves in the image in accordance with the user operation. Although an example in which the object to be monitored is the head of a person will be described in the present exemplary embodiment, an example in which the object indicator 17 indicating not only the head but also the whole of the person are displayed is illustrated in FIG. 5. Furthermore, the object indicator 17 is displayed together with obstacles 22 in FIG. 5. Furthermore, apart corresponding to a region 21 to be monitored in the image is also illustrated in FIG. 5.

The position designation reception unit 4 receives the user operation for designating the position to display the object indicator 17 on the user operation image (see FIG. 5). For example, when the user drags the object indicator 17 with a pointing device, the position designation reception unit 4 receives the destination that the user moves the object indicator 17 by the dragging operation as the position to display the object indicator 17. An example in which the user moves the object indicator 17 by a dragging operation will be described in the present exemplary embodiment. However, the user can designate the position to display the object indicator 17 by another operation.

When the user designates the position to display the object indicator 17 in the position designation reception unit 4, the image generation unit 3 changes the position on which the object indicator 17 is superimposed to the designated position and updates the user operation image.

At that time, the image generation unit 3 preferably changes, for example, the size or direction of the object indicator 17 depending on the position designated by the user. In that case, for example, the image generation unit 3 specifies, in the region to be monitored in the real space, the position corresponding to the position designated by the user in the image. The information storage unit 2 previously stores the information about the three-dimensional shape and size of the object indicator 17. Then, the image generation unit 3 may generate an image to be captured when the camera shoots a state in which the object with the three-dimensional shape and size is placed in the specified position in the region to be monitored. As a result, the size or direction of the object indicator 17 can be changed in the user operation image according to the position designated by the user. For example, the position and direction of the object indicator 17 when the object indicator 17 is displayed at a position A is different from those when the object indicator 17 is displayed at a position D in the image illustrated in FIG. 5.

When the user designates the position to display the object indicator 17 in the position designation reception unit 4, the image generation unit 3 specifies, in the region to be monitored in the real space, the position corresponding to the position designated by the user in the image as described above. Subsequently, the image generation unit 3 generates an image to be captured when the camera in accordance with the camera parameters shoots a state in which the object to be monitored in accordance with the shape and size stored in the information storage unit 2 is placed at the specified position, using CG. The image is used to evaluate the extent to which the image to be captured is suitable for the image recognition process. The image is referred to as an evaluation image. Information is generated based on the evaluation image. The information (user determination information) is used by the user to determine the extent to which the image to be captured is suitable for the image recognition process.

Note that the evaluation image is not an image actually captured with a camera, and is the image obtained by a simulation of shooting of the space in which the object to be monitored exists in the region to be monitored with the camera in accordance with the camera parameters.

The display control unit 10 also displays the user determination information on the display unit 11 in addition to the user operation image. The user determination information includes at least an image of a part that corresponds to the object to be monitored and that is extracted from the evaluation image. A specific example of the user determination information and an example of the display of the user determination information other than the image will be described below.

The non-hiding rate calculation unit 5 calculates a non-hiding rate. The non-hiding rate is the rate of a part of the object to be monitored that is included in the evaluation image and is not covered with the obstacle to the whole of the object to be monitored in the evaluation image. The non-hiding rate is in the range of zero to one.

Figure 6:
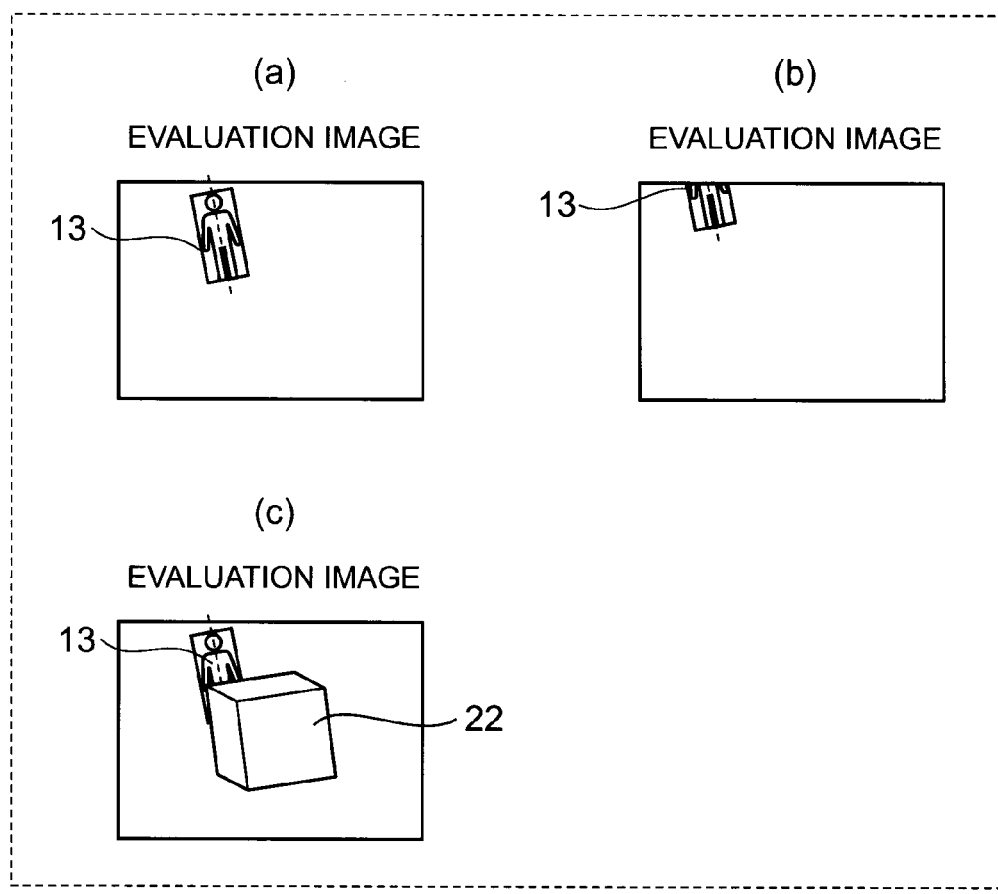
FIG. 6 IT depicts explanatory diagrams of exemplary evaluation images.

FIG. 6 is explanatory diagrams of exemplary evaluation images. For the sake of description, an example in which the object to be monitored includes not only the head but also the whole of the person will be described in FIG. 6.

The evaluation image illustrated in FIG. 6(a) includes the whole of the object 13 to be monitored. Thus, the non-hiding rate has a value of "one" in the example illustrated in FIG. 6(a).

The evaluation image illustrated in FIG. 6(b) includes only a part of the object 13 to be monitored. In the example illustrated in FIG. 6(c), a part of the object 13 to be monitored is covered with the obstacle 22. Thus, the non-hiding rate has a value less than one in the evaluation images illustrated in FIGS. 6(b) and 6(c).

The non-hiding rate calculation unit 5 calculates the non-hiding rate, for example, in a manner described below. The non-hiding rate calculation unit 5 generates an image that is large enough to include the object 13 to be monitored and that includes no obstacle. The image is on the assumption that the image captured with the camera is large enough. The whole of the object 13 to be monitored is included in the generated image and is not covered with an obstacle in the generated image. The non-hiding rate calculation unit 5 calculates the number of pixels (denoted with A) of the object 13 to be monitored in the generated image. Subsequently, the non-hiding rate calculation unit 5 calculates the number of pixels (denoted with B) of a part of the object 13 to be monitored that included in the evaluation image and that is not covered with an obstacle in the evaluation image. Then, the non-hiding rate calculation unit 5 calculates the rate of the number of pixels B to the number of pixels A, and determines the value as the non-hiding rate. The non-hiding rate is denoted with $\alpha$.

The non-hiding rate $\alpha$ is included in the user determination information.

As described above, a position corresponding to the position designated by the user in the image is specified in the region to be monitored in the real space with the image generation unit 3. The specified position is denoted with a reference sign P hereinafter.

The gazing point angle calculation unit 6 determines that the object to be monitored is placed at the position P, and calculates the straight line passing through the gazing point of the object to be monitored at the position P and the position of the camera with the camera parameters. Then, the gazing point angle calculation unit 6 calculates the angle between the straight line and the ground as the gazing point angle.

A first suitability calculation unit 7 calculates the gazing point angle evaluation value at the position P, using the gazing point angle and the gazing point angle evaluating function FA(a). The calculated gazing point angle at the position P is denoted with $a_P$. Furthermore, the gazing point angle evaluation value calculated from the gazing point angle $a_P$ is denoted with $SA_P$.

The first suitability calculation unit 7 evaluates the gazing point angle $a_P$ at the position P with the gazing point angle evaluating function FA(a) to calculate the gazing point angle evaluation value $SA_P$. In other words, the first suitability calculation unit 7 calculates the gazing point angle evaluation value $SA_P$ with the following expression (1).

$$SA_P = FA(a_P) \quad (1)$$

The calculated non-hiding rate of the object at the position P is denoted with $\alpha_P$. Then, the first suitability calculation unit 7 calculates the first suitability by multiplying the non-hiding rate $\alpha_P$ by the gazing point angle evaluation value $SA_P$ of the object at the position P. In other words, the first suitability calculation unit 7 calculates the first suitability with the following expression (2).

$$\text{First suitability} = \alpha_P \times SA_P \quad (2)$$

The suitability is an index indicating the extent to which the image to be captured in a state in which the object to be monitored is placed at the position P is suitable for the image recognition process. The first suitability is calculated in terms of the gazing point angle.

Calculating the first suitability evaluates the difference of the appearances or the degree of overlap of the objects to be monitored depending on the shooting angle of the camera, using the gazing point angle at the object to be monitored. The difference and overlap are important when the suitability for the image recognition process is evaluated.

The gazing point angle and the first suitability are included in the user determination information.

The resolution acquisition unit 8 acquires the resolution of the object to be monitored in the evaluation image, using the evaluation image generated with the image generation unit 3. As described above, any one of the pixel area of the object to be monitored in the image, the pixel area of the rectangles surrounding the object to be monitored in the image, and the vertical or horizontal pixel size of the rectangles may be used as the resolution.

The second suitability calculation unit 9 calculates the resolution evaluation value of the object at the position P, using the resolution acquired with the resolution acquisition unit 8 and the resolution evaluating function FR(r). The resolution of the object at the position P is denoted with $r_P$. Furthermore, the resolution evaluation value calculated from the resolution $r_P$ is denoted with $SR_P$.

The second suitability calculation unit 9 evaluates the resolution $r_P$ of the object at the position P with the resolution evaluating function FR(r) to calculate the resolution evaluation value $SR_P$. In other words, the second suitability calculation unit 9 calculates the resolution evaluation value $SR_P$ with the following expression (3).

$$SR_P = FR(r_P) \tag{3}$$

The second suitability calculation unit 9 further calculates the second suitability by multiplying the resolution evaluation value $SR_P$ of the object at the position P by the non-hiding rate $\alpha_P$. In other words, the second suitability calculation unit 9 calculates the second suitability with the following expression (4).

$$\text{Second suitability} = \alpha_P \times SR_P \tag{4}$$

The second suitability is calculated in terms of the resolution.

Calculating the second suitability evaluates the sharpness of the object to be monitored in the image, using the resolution of the object to be monitored. The sharpness is important when the suitability for the image recognition process is evaluated.

The resolution and the second suitability are included in the user determination information.

The display control unit 10 extracts an image of a part corresponding to the object to be monitored from the evaluation image to display the image of the part as the user determination information on the display unit 11. The image directly shows the appearance of the object to be monitored in the image to be captured with the camera. The display control unit 10 further displays the non-hiding rate, the gazing point angle, the first suitability, the resolution, the second suitability, and the non-hiding rate as the user determination information on the display unit 11.

The image generation unit 3, the position designation reception unit 4, the non-hiding rate calculation unit 5, the gazing point angle calculation unit 6, the first suitability calculation unit 7, the resolution acquisition unit 8, the second suitability calculation unit 9, and the display control unit 10 are implemented, for example, with the CPU in the computer operating in accordance with the appearance presentation program. In such a case, the CPU may read the appearance presentation program and operates as the image generation unit 3, the position designation reception unit 4, the non-hiding rate calculation unit 5, the gazing point angle calculation unit 6, the first suitability calculation unit 7, the resolution acquisition unit 8, the second suitability calculation unit 9, and the display control unit 10 in accordance with the program. Alternatively, the appearance presentation program may be recorded in a computer-readable recording medium. Alternatively, the image generation unit 3, the position designation reception unit 4, the non-hiding rate calculation unit 5, the gazing point angle calculation unit 6, the first suitability calculation unit 7, the resolution acquisition unit 8, the second suitability calculation unit 9, and the display control unit 10 may separately be implemented with different hardware.

Figure 7:
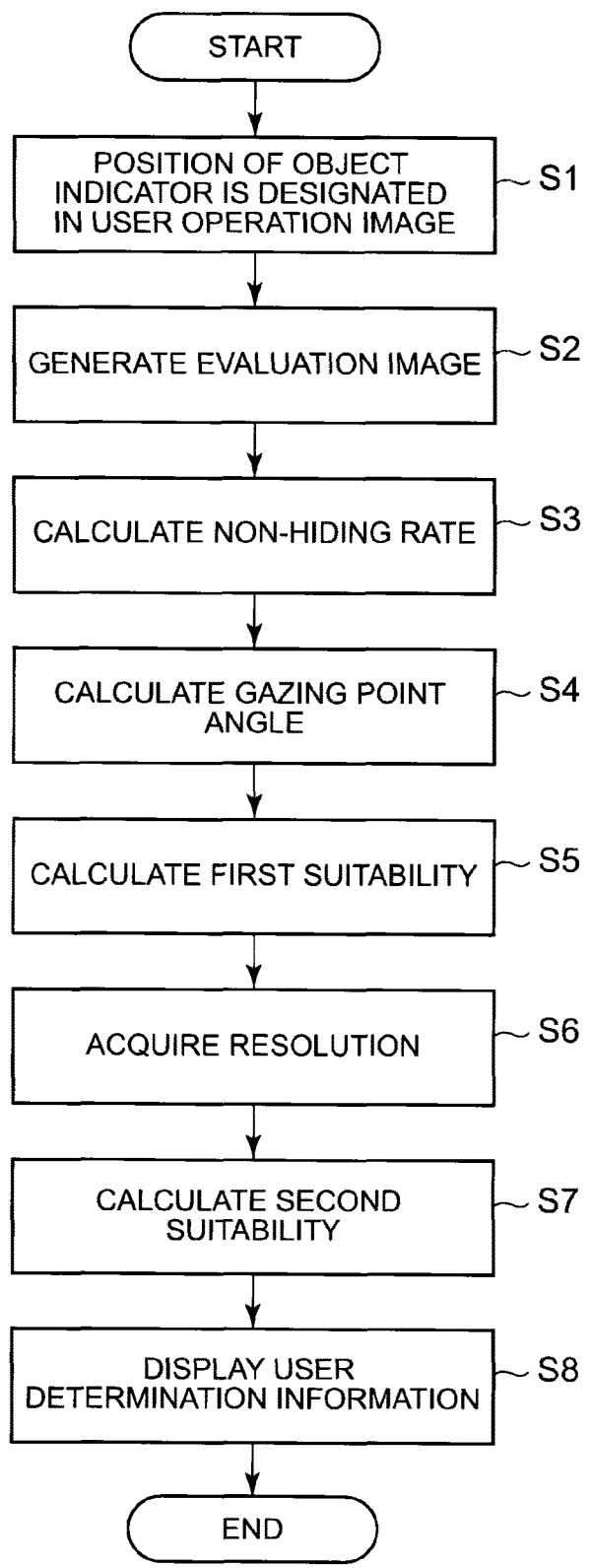
FIG. 7 It depicts a flowchart of an example of the process according to the present invention.

Next, the process according to the present invention will be described. FIG. 7 is a flowchart of an exemplary process according to the present invention. Note that the display control unit 10 displays a user operation image.

The position designation reception unit 4 receives the position of the object indicator 17 designated by the user in the user operation image (for example, see FIG. 5) (step S1). For example, the user drags the object indicator 17 in a dragging operation. Then, the position designation reception unit 4 receives the destination of the object indicator 17 by the dragging operation as the position to display the object indicator 17. In response to step S1, the image generation unit 3 generates a user operation image in which the position of the object indicator 17 is changed to the designated position. Subsequently, the display control unit 10 displays the generated user operation image on the display unit 11.

After step S1, the image generation unit 3 specifies, in the monitoring region in the real space, the position P corresponding to the position in the user operation image designated in step S1. Then, the image generation unit 3 generates an image to be captured when the camera in accordance with the camera parameters shoots a state in which the object to be monitored is placed at the position P (namely, an evaluation image) (step S2).

Next, the non-hiding rate calculation unit 5 calculates the non-hiding rate $\alpha_P$ of the object at the position P based on the evaluation image generated in step S2 (step S3).

The gazing point angle calculation unit 6 calculates the gazing point angle $a_P$ of the object at the position P (step S4). Specifically, the gazing point angle calculation unit 6 determines that the object to be monitored is placed at the position P, and calculates the straight line passing through the gazing point of the object to be monitored in the state P and the position of the camera. Then, the gazing point angle calculation unit 6 calculates the angle between the straight line and the ground. The angle is the gazing point angle $a_P$.

Next, the first suitability calculation unit 7 calculates the gazing point angle evaluation value $SA_P$ by the expression (1) with the gazing point angle $a_P$ of the objection at the position P and the gazing point angle evaluating function. The first suitability calculation unit 7 further calculates the first suitability of the object at the position P by multiplying the gazing point angle evaluation value $SA_P$ by the non-hiding rate $\alpha_P$ (step S5).

The resolution acquisition unit 8 acquires the resolution of the object to be monitored in the evaluation image generated with the image generation unit 3 (step S6). The resolution is the resolution $r_P$ of the object at the position P.

Next, the second suitability calculation unit 9 calculates the resolution evaluation value $SR_P$ by the expression (3) with the resolution $r_P$ of the object at the position P and the resolution evaluating function. The second suitability calculation unit 9 further calculates the second suitability of the object at the position P by multiplying the resolution evaluation value $SR_P$ by the non-hiding rate $\alpha_P$ (step S7).

Subsequently, the display control unit 10 displays the user determination information on the display unit 11 (step S8). The display control unit 10 extracts the image of a part corresponding to the object to be monitored from the evaluation image, and displays the image of the part as the user determination information on the display unit 11. The display control unit 10 further displays the non-hiding rate, the gazing point angle, the first suitability, the resolution, and the second suitability as the user determination information on the display unit 11. In the exemplary embodiment, the display control unit 10 displays the size of the gazing point angle as a diagram on the display unit 11 together with the value of the gazing point angle on the display unit 11. The appearance presentation system 1 may display only one of the diagram and value of the gazing point angle. However, displaying the diagram showing the size of the gazing point angle enables the user to intuitively grasp the size of the gazing point angle. Thus, it is preferable to display the diagram showing the size of the gazing point angle.

FIGS. 8 to 11 are explanatory diagrams of exemplary displays of the user determination information displayed in step S8. Note that the examples illustrated in FIGS. 8 to 11 describe that it is preferable that the gazing point angle is more approximate to the specific angle (at which the image of the front view of the face can be captured and the used image recognition engine works most efficiently).

The image display box 51 illustrated in each of FIGS. 8 to 11 displays the image of the part that corresponds to the object to be monitored and that is extracted from the evaluation image. The image display box 51 is maintained at a constant size. The display control unit 10 displays the image of the part corresponding to the object to be monitored in accordance with the size of the image display box 51. In such a case, the display control unit 10 performs a process in which the resolution of the original image is shown (for example, a Nearest neighbor interpolation) rather than a Bilinear interpolation or a Bicubic interpolation in the process for resizing the image to display the image. The appearance of the object to be monitored in the image to be captured with the camera is directly shown in the image display box 51.

The non-hiding rate display box 57 displays the non-hiding rate calculated in step S3.

The gazing point angle display box 55 displays the value of the gazing point angle calculated in step S4. The gazing point angle display box 54 further displays a diagram indicating the size of the gazing point angle.

The first suitability display box 56 displays the first suitability calculated in step S5.

The resolution display box 52 displays the resolution acquired in step S6.

The second suitability display box 53 displays the second suitability calculated in step S7.

Each of FIGS. 8 to 11 illustrates the example in which not only the values of the non-hiding rate, the first suitability and the second suitability but also the bars having the lengths corresponding to the values are displayed (see the non-hiding rate display boxes 57, the first suitability display boxes 56, and the second suitability display boxes 53 illustrated in each of FIGS. 8 to 11).

The display control unit 10 displays the user determination information on the display unit 11 while including the information in the display boxes 51 to 57.

Figure 8:
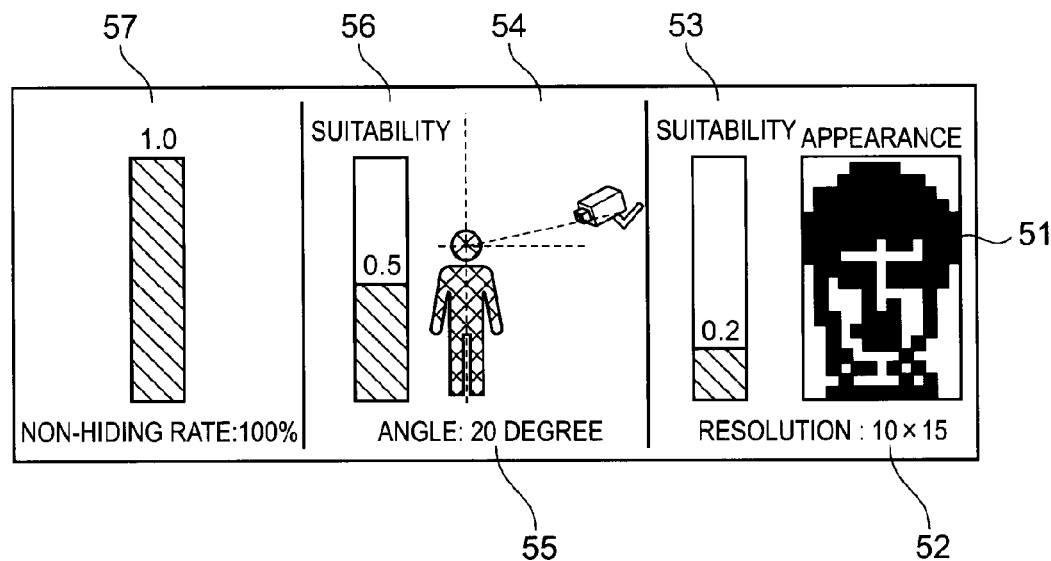
FIG. 8 It depicts an explanatory diagram of an exemplary display of the user determination information displayed in step S8.

FIG. 8 illustrates an example of the user determination information when the position A illustrated in FIG. 5 is designated. The object to be monitored placed at the position A is small in the image. Thus, when the image is displayed in the image display box 51 having a predetermined size, the image is grainy as illustrated in FIG. 8. The image display box 51 illustrated in FIG. 8 shows the degree of the gazing point angle, and that the object to be monitored is not covered with an obstacle. Thus, the user can determine, from the image display box 51 illustrated in FIG. 8, that the image to be captured when the object to be monitored is placed at the position A (see FIG. 5) is not preferable for the image recognition process in terms of the resolution, although the object to be monitored is preferably not covered with an obstacle. The image displayed in the image display box 51 comprehensively shows the non-hiding rate, the gazing point angle, and the resolution. Thus, by referring to the non-hiding rate, the gazing point angle, and the resolution in the image, the user can determine the extent to which the image to be captured when the object to be monitored is placed at the designated position is suitable for the image recognition process.

A diagram indicating the degree of the gazing point angle is displayed in the gazing point angle display box 54. Thus, the user can easily see the degree of the gazing point angle, and thus can determine the extent to which the image to be captured when the object to be monitored is placed at the designated position is suitable for the image recognition process in terms of the gazing point angle. The value of the gazing point angle is displayed in the gazing point angle display box 55. The first suitability is displayed in the first suitability display box 56. By referring to those values, the user can also determine the extent to which the image to be captured is suitable for the image recognition process in terms of the gazing point angle.

The value of the non-hiding rate is displayed in the non-hiding rate display box 57. By referring to the value, the user can determine the extent to which the image to be captured is suitable for the image recognition process in terms of the non-hiding rate (in other words, in terms of the extent to which the object to be monitored is seen in the image to the whole of the object to be monitored).

The value of the resolution is displayed in the resolution display box 52. The second suitability is displayed in the second suitability display box 53. By referring to those values, the user can determine the extent to which the image to be captured is suitable for the image recognition process in terms of the resolution.

Figure 9:
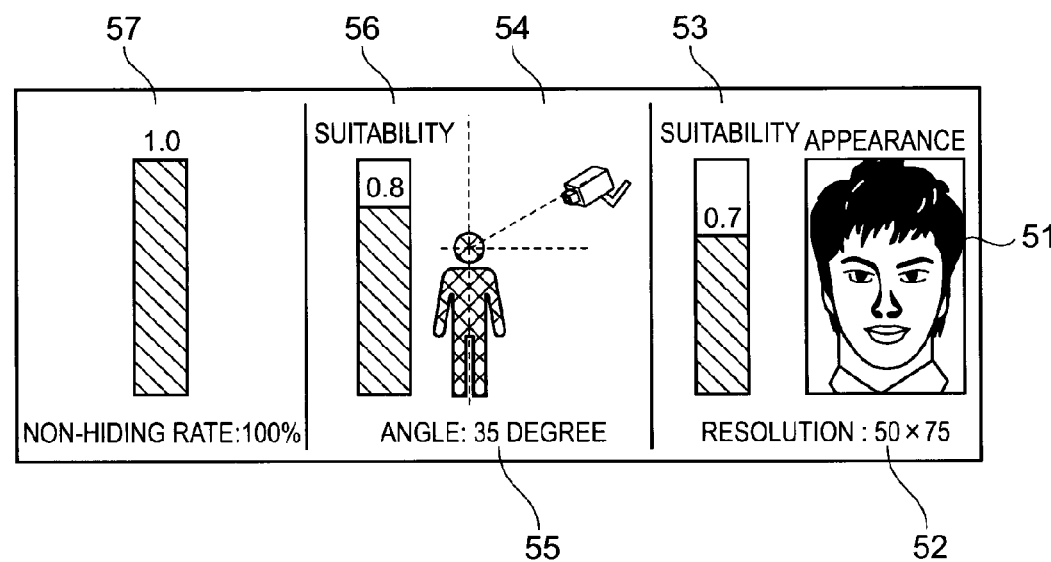
FIG. 9 It depicts an explanatory diagram of an exemplary display of the user determination information displayed in step S8.

FIG. 9 illustrates an example of the user determination information when the position B illustrated in FIG. 5 is designated. The image display box 51 illustrated in FIG. 9 shows that the image has a good gazing point angle, and a good resolution, and also that the object to be monitored is not covered with an obstacle. Thus, the user can determine from the image display box 51 illustrated in FIG. 9 that the captured image of the object to be monitored placed at the position B (see FIG. 5) is suitable for the image recognition process in terms of all of the gazing point angle, the resolution, and the non-hiding rate.

Figure 10:
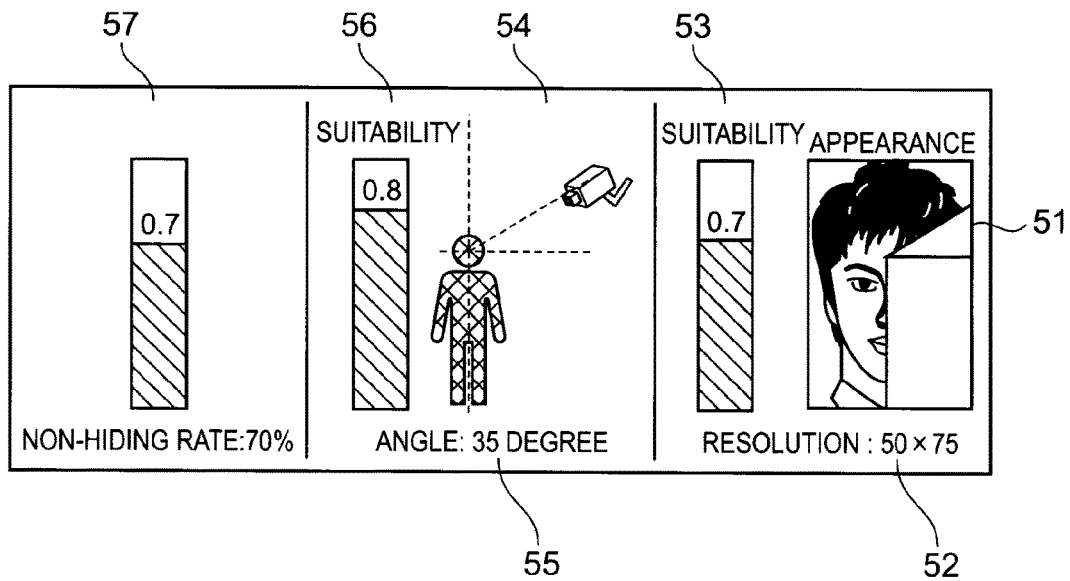
FIG. 10 It depicts an explanatory diagram of an exemplary display of the user determination information displayed in step S8.

FIG. 10 illustrates an example of the user determination information when the position C illustrated in FIG. 5 is designated. The image display box 51 illustrated in FIG. 10 shows that the image has a good gazing point angle, and a good resolution, and that the object to be monitored is covered with an obstacle. Thus, the user can determine from the image display box 51 illustrated in FIG. 10 that the image to be captured when the object to be monitored is placed at the position C (see FIG. 5) is suitable for the image recognition process in terms of the gazing point angle and the resolution, but is not suitable in terms of the non-hiding rate.

Figure 11:
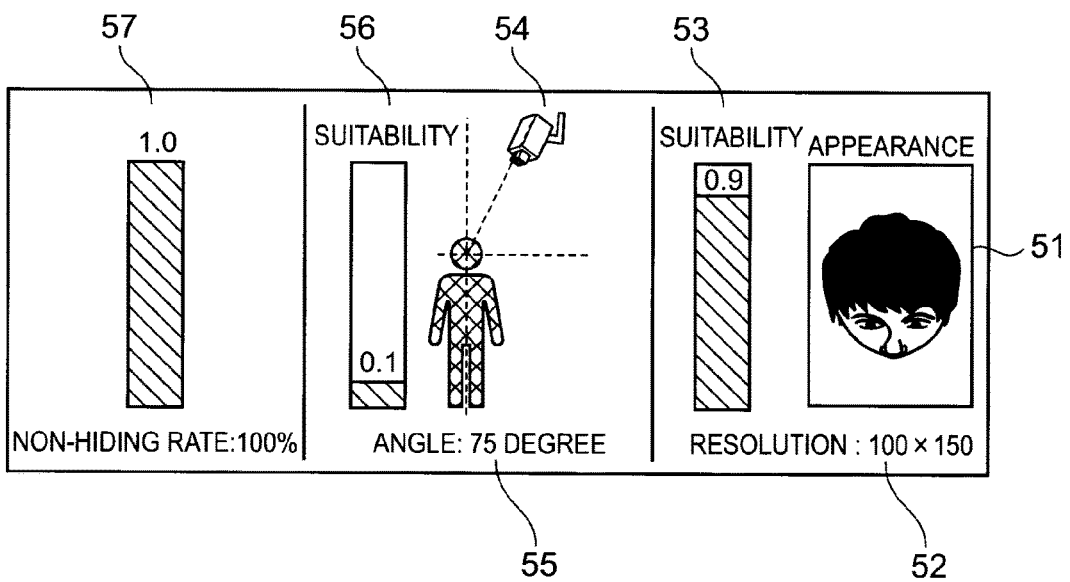
FIG. 11 It depicts an explanatory diagram of an exemplary display of the user determination information displayed in step S8.

FIG. 11 illustrates an example of the user determination information when the position D illustrated in FIG. 5 is designated. The image display box 51 illustrated in FIG. 11 shows that the image has a large gazing point angle because the image of the head is captured from above, that the image has a good resolution, and that the object to be monitored is not covered with an obstacle. Thus, the user can determine from the image display box 51 illustrated in FIG. 11 that the image to be captured when the object to be monitored is placed at the position D (see FIG. 5) is suitable for the image recognition process in terms of the non-hiding rate and the resolution, but is not suitable in terms of the gazing point angle.

In each of exemplary displays illustrated in FIGS. 8 to 11, the user can quantitatively determine, by referring to the other display boxes 52 to 57, the suitability of the image in terms of the non-hiding rate, and the gazing point angle, and the resolution, respectively.

As described above, the appearance presentation system in the present exemplary embodiment generates an image (an evaluation image) to be captured when the object to be monitored is placed at the position that is in the region to be monitored in the real space and that corresponds to the position designated in the user operation image by the user. Then, the appearance presentation system displays the image of apart that corresponds to the object to be monitored and that is extracted from the evaluation image. Thus, the appearance presentation system can present, to the user, how the object to be monitored is seen in the image to be captured when the object to be monitored is placed at the designated position. In other words, the appearance presentation system can present the appearance of the object to be monitored in the image to be captured to the user. Then, by checking the appearance, the user can comprehensively check the extent to which the image to be captured with the camera is suitable for the image recognition process in terms of the non-hiding rate, the gazing point angle, and the resolution. Furthermore, the user can check the suitability before the user actually places and uses the camera.

The appearance presentation system in the present exemplary embodiment displays the degree of the gazing point angle as a diagram. Thus, the user can determine the extent to which the image to be captured is suitable for the image recognition process in terms of the gazing point angle. The appearance presentation system displays also the gazing point angle and the value of the first suitability. Thus, from the values, the user can determine the suitability of the captured image in terms of the gazing point angle.

The appearance presentation system in the present exemplary embodiment displays also the values of the resolution and the second suitability. Thus, the user can determine the extent to which the image to be captured is suitable for the image recognition process in terms of the resolution.

The appearance presentation system in the present exemplary embodiment displays also the value of the non-hiding rate. Thus, the user can determine the extent to which the image to be captured is suitable for the image recognition process in terms of the non-hiding rate.

Note that the process illustrated in FIG. 7 is an example. The order in the process according to the present invention is not limited to the order illustrated in FIG. 7.

The appearance presentation system 1 of the present invention displays at least a part that corresponds to the object to be monitored and that is extracted from the evaluation image as the user determination information.

The appearance presentation system 1 can omit the display of the first suitability. In such a case, the appearance presentation system 1 does not necessarily include the first suitability calculation unit 7. Furthermore, the appearance presentation system 1 can omit the display of the gazing point angle. In such a case, the appearance presentation system 1 does not necessarily include the gazing point angle calculation unit 6.

The appearance presentation system 1 can omit the display of the second suitability. In such a case, the appearance presentation system 1 does not necessarily include the second suitability calculation unit 9. Furthermore, the appearance presentation system 1 can omit the display of the resolution. In such a case, the appearance presentation system 1 does not necessarily include the resolution acquisition unit 8.

The appearance presentation system 1 can omit the display of the non-hiding rate. The appearance presentation system 1 does not necessarily include the non-hiding rate calculation unit 5 when omitting the displays of the non-hiding rate, the first suitability, and the second suitability.

FIG. 5 illustrates the object indicator 17 in a simplified shape. However, an object indicator 17 that specifically describes the object to be monitored may be displayed. In such a case, the image generation unit 3 may generate an image of the object indicator 17 based on the shape and size of the object to be monitored. The shape and size are stored in the information storage object 2.

Figure 12:
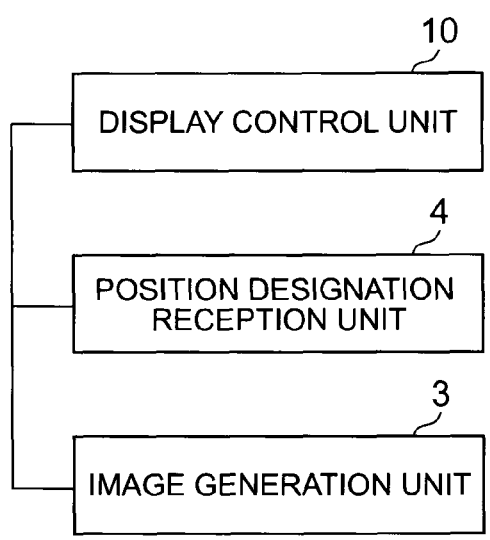
FIG. 12 It depicts a block diagram of exemplary primary components of the present invention.
Figure 13:
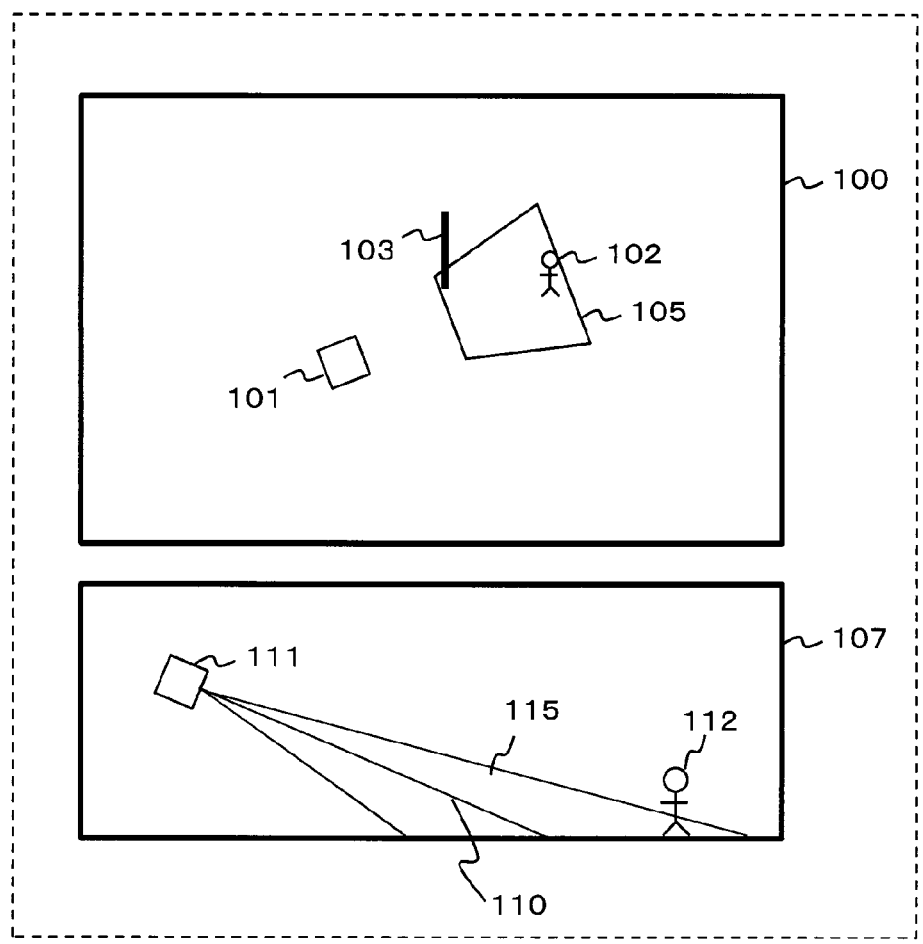
FIG. 13 It depicts a schematic diagram of the horizontal and schematic views displayed with the technique described in PLT 1.

Next, the primary components of the present invention will be described. FIG. 12 is a block diagram of exemplary primary components of the present invention. The appearance presentation system of the present invention includes the display control unit 10, the position designation reception unit 4, and the image generation unit 3 as the primary components.

The display control unit 10 displays, on the display device, an image obtained by superimposing an object indicator indicating the object to be monitored on an image to be captured when a camera of which position and posture are determined shoots a predetermined region to be monitored (for example, the user operation image).

The position designation reception unit 4 receives the designation of the position of the object indicator in the image.

The image generation unit 3 generates an image (for example, the evaluation image) to be captured when the camera shoots a state in which the object to be monitored is placed at the position that is in the region to be monitored and that corresponds to the position designated in the image.

The display control unit 10 extracts apart corresponding to the object to be monitored from the image generated in the image generation unit 3 and displays the part on the display device.

The configuration described above can present the appearance of the object to be monitored at the position designated by the user in the image so as to enable the user to previously grasp the extent to which the image to be captured with the camera is suitable for the image recognition process.

A part or the whole of the exemplary embodiment may also be described as the following supplementary notes, but is not limited to the followings.

(Supplementary Note 1)

An appearance presentation system including: a display control means configured to display, on a display device, an image obtained by superimposing an object indicator indicating an object to be monitored on an image to be captured when a camera of which position and posture are determined shoots a predetermined region to be monitored; a position designation reception means configured to receive a designation of a position of the object indicator in the image; and an image generation means configured to generate an image to be captured when the camera shoots a state in which the object to be monitored is placed at the position that is in the region to be monitored and that corresponds to the position designated in the image. The display control means extracts a part corresponding to the object to be monitored from the image generated in the image generation means, and displays the part on the display device.

(Supplementary Note 2)

The appearance presentation system according to the supplementary note 1, further including: a gazing point calculation means configured to calculate a gazing point angle that is an angle between a straight line and a ground, the straight line passing through a gazing point and the position of the camera, the gazing point being in the object to be monitored placed at a position that is in the region to be monitored and that corresponds to the position designated in the image, wherein the display control means displays a diagram indicating the gazing point angle on the display device.

(Supplementary Note 3)

The appearance presentation system according to the supplementary note 1 or 2, further including: a non-hiding rate calculation means configured to calculate a non-hiding rate that is a rate of a part of the object to be monitored to the object to be monitored as a whole in an image generated in the image generation means, the part being included in the image and being not covered with an obstacle; a gazing point calculation means configured to calculate a gazing point angle that is an angle between a straight line and a ground, the straight line passing through a gazing point and the position of the camera, the gazing point being in the object to be monitored placed at a position that is in the region to be monitored and that corresponds to the position designated in the image; and a first suitability calculation means configured to calculate a gazing point angle evaluation value at a position of the object to be monitored in the region to be monitored by evaluating the gazing point angle with a gazing point angle evaluating function that determines a relationship between the gazing point angle and the gazing point angle evaluation value indicating a suitability for an image recognition process, and calculate a first suitability indicating the suitability of the image of the object to be monitored at the position for the image recognition process based on the gazing point angle evaluation value and the non-hiding rate, wherein the display control means displays the gazing point angle and the first suitability on the display device.

(Supplementary Note 4)

The appearance presentation system according to any of the supplementary notes 1 to 3, further including: a non-hiding rate calculation means configured to calculate a non-hiding rate that is a rate of a part of the object to be monitored to the object to be monitored as a whole in an image generated in an image generation means, the part being included in the image and being not covered with an obstacle; a resolution acquisition means configured to acquire a resolution of the object to be monitored in an image generated in the image generation means; and a second suitability calculation means configured to calculate a resolution evaluation value at a position of the object to be monitored in the region to be monitored by evaluating the resolution with a resolution evaluating function that determines a relationship between the resolution and the resolution evaluation value indicating a suitability for an image recognition process, and calculate a second suitability indicating the suitability of the image of the object to be monitored at the position for the image recognition process based on the resolution evaluation value and the non-hiding rate, wherein the display control means displays the resolution and the second suitability on the display device.

(Supplementary Note 5)

The appearance presentation system according to the supplementary note 3 or 4, wherein the display control means displays the non-hiding rate on the display device.

(Supplementary Note 6)

An appearance presentation method including: displaying, on a display device, an image obtained by superimposing an object indicator indicating an object to be monitored on an image to be captured when a camera of which position and posture are determined shoots a predetermined region to be monitored; receiving a designation of a position of the object indicator in the image; generating an image to be captured when the camera shoots a state in which the object to be monitored is placed at the position that is in the region to be monitored and that corresponds to the position designated in the image; and extracting a part corresponding to the object to be monitored from the generated image, and displaying the part on the display device.

(Supplementary Note 7)

The appearance presentation method according to the supplementary note 6, further including: calculating a gazing point angle that is an angle between a straight line and a ground, the straight line passing through a gazing point and the position of the camera, the gazing point being in the object to be monitored placed at a position that is in the region to be monitored and that corresponds to the position designated in the image; and displaying a diagram indicating the gazing point angle on the display device.

(Supplementary Note 8)

The appearance presentation method according to the supplementary note 6 or 7, further including: calculating a non-hiding rate that is a rate of a part of the object to be monitored to the object to be monitored as a whole in an image generated as an image to be captured when a camera shoots a state in which the object to be monitored is placed, the part being included in the image and being not covered with an obstacle; calculating a gazing point angle that is an angle between a straight line and a ground, the straight line passing through a gazing point and the position of the camera, the gazing point being in the object to be monitored placed at a position that is in the region to be monitored and that corresponds to the position designated in the image; and calculating a gazing point angle evaluation value at a position of the object to be monitored in the region to be monitored by evaluating the gazing point angle with a gazing point angle evaluating function that determines a relationship between the gazing point angle and the gazing point angle evaluation value indicating a suitability for an image recognition process; calculating a first suitability indicating the suitability of the image of the object to be monitored that is placed at the position for the image recognition process based on the gazing point angle evaluation value and the non-hiding rate; and displaying the gazing point angle and the first suitability on the display device.

(Supplementary Note 9)

The appearance presentation method according to any of the supplementary notes 6 to 8, further including: calculating a non-hiding rate that is a rate of a part of the object to be monitored to the object to be monitored as a whole in an image generated as an image to be captured when a camera shoots a state in which the object to be monitored is placed, the part being included in the image and being not covered with an obstacle; acquiring a resolution of the object to be monitored in the image; calculating a resolution evaluation value at a position of the object to be monitored in the region to be monitored by evaluating the resolution with a resolution evaluating function that determines a relationship between the resolution and the resolution evaluation value indicating a suitability for an image recognition process; calculating a second suitability indicating the suitability of the image of the object to be monitored that is placed at the position for the image recognition process based on the resolution evaluation value and the non-hiding rate; and displaying the resolution and the second suitability on the display device.

(Supplementary Note 10)

The appearance presentation method according to the supplementary note 8 or 9, further including: displaying the non-hiding rate on the display device.

(Supplementary Note 11)

An appearance presentation program for causing a computer to execute: a display control process for displaying, on a display device, an image obtained by superimposing an object indicator indicating an object to be monitored on an image to be captured when a camera of which position and posture are determined shoots a predetermined region to be monitored; a position designation reception process for receiving a designation of a position of the object indicator in the image; an image generation process for generating an image to be captured when the camera shoots a state in which the object to be monitored is placed at the position that is in the region to be monitored and that corresponds to the position designated in the image; and a user determination information display process for extracting a part corresponding to the object to be monitored from the image generated in the image generation process, and displaying the part on the display device.

(Supplementary Note 12)

The appearance presentation program according to the supplementary note 11 for causing the computer to execute: a gazing point calculation process for calculating a gazing point angle that is an angle between a straight line and a ground, the straight line passing through a gazing point and the position of the camera, the gazing point being in the object to be monitored placed at a position that is in the region to be monitored and that corresponds to the position designated in the image, wherein the user determination information display process includes displaying a diagram indicating the gazing point angle on the display device.

(Supplementary Note 13)

The appearance presentation program according to the supplementary note 11 or 12 for causing the computer to execute: a non-hiding rate calculation process for calculating a non-hiding rate that is a rate of a part of the object to be monitored to the object to be monitored as a whole in an image generated in the image generation process, the part being included in the image and being not covered with an obstacle; a gazing point calculation process for calculating a gazing point angle that is an angle between a straight line and a ground, the straight line passing through a gazing point and the position of the camera, the gazing point being in the object to be monitored placed at a position that is in the region to be monitored and that corresponds to the position designated in the image; and a first suitability calculation process for calculating a gazing point angle evaluation value at a position of the object to be monitored in the region to be monitored by evaluating the gazing point angle with a gazing point angle evaluating function that determines a relationship between the gazing point angle and the gazing point angle evaluation value indicating a suitability for an image recognition process, and calculating a first suitability indicating the suitability of the image of the object to be monitored at the position for the image recognition process based on the gazing point angle evaluation value and the non-hiding rate, wherein the user determination information display process includes displaying the gazing point angle and the first suitability on the display device.

(Supplementary Note 14)

The appearance presentation program according to any of the supplementary notes 11 to 13 for causing the computer to execute: a non-hiding rate calculation process for calculating a non-hiding rate that is a rate of a part of the object to be monitored to the object to be monitored as a whole in an image generated in the image generation process, the part being included in the image and being not covered with an obstacle; a resolution acquisition process for acquiring a resolution of the object to be monitored in the image that is generated in the image generation process; and a second suitability calculation process for calculating a resolution evaluation value at a position of the object to be monitored in the region to be monitored by evaluating the resolution with a resolution evaluating function that determines a relationship between the resolution and the resolution evaluation value indicating a suitability for an image recognition process, and calculating a second suitability indicating the suitability of the image of the object to be monitored at the position for the image recognition process based on the resolution evaluation value and the non-hiding rate, wherein the user determination information display process includes displaying the resolution and the second suitability on the display device.

(Supplementary Note 15)

The appearance presentation program according to the supplementary note 13 or 14 for causing the computer to execute the user determination information display process for displaying the non-hiding rate on the display device.

The present application claims a priority of Japanese Patent Application No. 2012-267554 filed on Dec. 6, 2012. The disclosure of Japanese Patent Application No. 2012-267554 is incorporated herein by reference in its entirety.

The present invention has been described above with reference to the exemplary embodiment. However, the present invention is not limited to the exemplary embodiment. The configuration and details of the present invention can variously be changed within the scope of the present invention and in the range in which persons skilled in the art can understand the change.

INDUSTRIAL APPLICABILITY

The present invention is preferably used for an appearance presentation system configured to present how an object to be monitored and to be shot with a camera is seen in the image to be captured to the user.

REFERENCE SIGNS LIST

1 Appearance presentation system
2 Information storage unit
3 Image generation unit
4 Position designation reception unit
5 Non-hiding rate calculation unit
6 Gazing point angle calculation unit
7 First suitability calculation unit
8 Resolution acquisition unit
9 Second suitability calculation unit
10 Display control unit
11 Display unit

The invention claimed is:
1. An appearance presentation system comprising:
a memory storing instructions; and
one or more processors configured to execute the instructions to:

display, on a display device, a second image obtained by superimposing an object indicator image, indicating an object to be monitored, on a first image to be captured when a camera, whose position and posture are determined, shoots a predetermined region to be monitored;

receive a designation of a position of the object indicator image in the second image;

generate a third image to be captured when the camera shoots the object to be monitored placed at a position that is in the region to be monitored and that corresponds to the position designated in the second image; and extract a part corresponding to the object to be monitored from the third image; and display, on the display device, the part and one or more suitabilities based on a non-hiding rate that is a rate of the part of the object to be monitored to the whole of the object to be monitored in the third image, the part being included in the third image and not being covered with an obstacle.

2. The appearance presentation system according to claim 1, wherein the one or more processors are further configured to execute the instructions to:

calculate a gazing point angle that is an angle between a straight line and a ground, the straight line passing through a gazing point and the position of the camera, the gazing point being in the object to be monitored placed at a position that is in the region to be monitored and that corresponds to the position designated in the second image; and display a diagram indicating the gazing point angle on the display device.

3. The appearance presentation system according to claim 1, wherein the one or more processors are further configured to execute the instructions to:

calculate a non-hiding rate that is a rate of the part of the object to be monitored to the whole of the object to be monitored in the third image, the part being included in the third image and not being covered with an obstacle;

calculate a gazing point angle that is an angle between a straight line and a ground, the straight line passing through a gazing point and the position of the camera, the gazing point being in the object to be monitored placed at a position that is in the region to be monitored and that corresponds to the position designated in the second image;

calculate a gazing point angle evaluation value at a position of the object to be monitored in the region to be monitored by evaluating the gazing point angle with a gazing point angle evaluating function that determines a relationship between the gazing point angle and the gazing point angle evaluation value indicating a suitability for the third image recognition;

calculate a first suitability indicating a suitability of the third image of the object to be monitored at the position for the third image recognition based on the gazing point angle evaluation value and the non-hiding rate; and display the gazing point angle and the first suitability on the display device.

4. The appearance presentation system according to claim 3, wherein the one or more processors are further configured to execute the instructions to: display the non-hiding rate on the display device.

5. The appearance presentation system according to claim 3, wherein the one or more processors are further configured to execute the instructions to:

calculate the first suitability by multiplying the non-hiding rate by the gazing point angle evaluation value of the object at the position.

6. The appearance presentation system according to claim 1, wherein the one or more processors are further configured to execute the instructions to:

calculate a non-hiding rate that is a rate of a part of the object to be monitored to the whole of the object to be monitored in the third image, the part being included in the third image and not being covered with an obstacle;

acquire a resolution of the object to be monitored in the third image;

calculate a resolution evaluation value at a position of the object to be monitored in the region to be monitored by evaluating the resolution with a resolution evaluating function that determines a relationship between the resolution and the resolution evaluation value indicating a suitability for the third image recognition;

calculate a second suitability indicating a suitability of the third image of the object to be monitored at the position for the third image recognition based on the resolution evaluation value and the non-hiding rate; and display the resolution and the second suitability on the display device.

7. The appearance presentation system according to claim 6, wherein the one or more processors are further configured to execute the instructions to:

calculate the second suitability by multiplying the non-hiding rate by the resolution evaluation value of the object at the position.

8. An appearance presentation method comprising:

displaying, on a display device, a second image obtained by superimposing an object indicator image, indicating an object to be monitored, on a first image to be captured when a camera, whose position and posture are determined, shoots a predetermined region to be monitored;

receiving a designation of a position of the object indicator image in the second image;

generating a third image to be captured when the camera shoots the object to be monitored placed at a position that is in the region to be monitored and that corresponds to the position designated in the second image;

extracting a part corresponding to the object to be monitored from the third image; and displaying, on the display device, the part and one or more suitabilities based on a non-hiding rate that is a rate of the part of the object to be monitored to the whole of the object to be monitored in the third image, the part being included in the third image and not being covered with an obstacle.

9. The appearance presentation method according to claim 8, the method further comprising:

calculating a gazing point angle that is an angle between a straight line and a ground, the straight line passing through a gazing point and the position of the camera, the gazing point being in the object to be monitored placed at a position that is in the region to be monitored and that corresponds to the position designated in the second image; and displaying a diagram indicating the gazing point angle on the display device.

10. The appearance presentation method according to claim 8, the method further comprising:

calculating a non-hiding rate that is a rate of the part of the object to be monitored to the whole of the object to be monitored in the third image, the part being included in the third image and not being covered with an obstacle;

calculating a gazing point angle that is an angle between a straight line and a ground, the straight line passing through a gazing point and the position of the camera, the gazing point being in the object to be monitored placed at a position that is in the region to be monitored and that corresponds to the position designated in the second image;

calculating a gazing point angle evaluation value at a position of the object to be monitored in the region to be monitored by evaluating the gazing point angle with a gazing point angle evaluating function that determines a relationship between the gazing point angle and the gazing point angle evaluation value indicating a suitability for the third image recognition;

calculating a first suitability indicating a suitability of the third image of the object to be monitored at the position for the third image recognition based on the gazing point angle evaluation value and the non-hiding rate; and displaying the gazing point angle and the first suitability on the display device.

11. The appearance presentation method according to claim 10, the method further comprising:

calculating the first suitability by multiplying the non-hiding rate by the gazing point angle evaluation value of the object at the position.

12. The appearance presentation method according to claim 8, the method further comprising:

calculating a non-hiding rate that is a rate of a part of the object to be monitored to the whole of the object to be monitored in the third image, the part being included in the third image and not being covered with an obstacle;

acquiring a resolution of the object to be monitored in the third image;

calculating a resolution evaluation value at a position of the object to be monitored in the region to be monitored by evaluating the resolution with a resolution evaluating function that determines a relationship between the resolution and the resolution evaluation value indicating a suitability for the third image recognition;

calculating a second suitability indicating a suitability of the third image of the object to be monitored at the position for the third image recognition based on the resolution evaluation value and the non-hiding rate; and displaying the resolution and the second suitability on the display device.

13. The appearance presentation method according to claim 12, the method further comprising:

calculating the second suitability by multiplying the non-hiding rate by the resolution evaluation value of the object at the position.

14. The appearance presentation method according to claim 8, the method further comprising:

displaying the non-hiding rate on the display device.

15. A non-transitory computer readable recording medium in which an appearance presentation program is recorded, that when executed by a processor, performs a method, the method comprising:

displaying, on a display device, a second image obtained by superimposing an object indicator image, indicating an object to be monitored, on a first image to be captured when a camera, whose position and posture are determined, shoots a predetermined region to be monitored;

receiving a designation of a position of the object indicator image in the second first image;

generating a third image to be captured when the camera shoots the object to be monitored placed at a position that is in the region to be monitored and that corresponds to the position designated in the second image; and extracting a part corresponding to the object to be monitored from the third image; and displaying, on the display device, the part and one or more suitabilities based on a non-hiding rate that is a rate of the part of the object to be monitored to the whole of the object to be monitored in the third image, the part being included in the third image and not being covered with an obstacle.

16. The non-transitory computer readable recording medium in which the appearance presentation program is recorded according to claim 15, further comprising:

calculating a gazing point angle that is an angle between a straight line and a ground, the straight line passing through a gazing point and the position of the camera, the gazing point being in the object to be monitored placed at a position that is in the region to be monitored and that corresponds to the position designated in the second image; and displaying a diagram indicating the gazing point angle on the display device.

17. The non-transitory computer readable recording medium in which the appearance presentation program is recorded according to claim 15, further comprising:

calculating a non-hiding rate that is a rate of the part of the object to be monitored to the whole of the object to be monitored in the third image, the part being included in the third image and not being covered with an obstacle;

calculating a gazing point angle that is an angle between a straight line and a ground, the straight line passing through a gazing point and the position of the camera, the gazing point being in the object to be monitored placed at a position that is in the region to be monitored and that corresponds to the position designated in the second image;

calculating a gazing point angle evaluation value at a position of the object to be monitored in the region to be monitored by evaluating the gazing point angle with a gazing point angle evaluating function that determines a relationship between the gazing point angle and the gazing point angle evaluation value indicating a suitability for the third image recognition;

calculating a first suitability indicating a suitability of the third image of the object to be monitored at the position for the third image recognition based on the gazing point angle evaluation value and the non-hiding rate; and displaying the gazing point angle and the first suitability on the display device.

18. The non-transitory computer readable recording medium in which the appearance presentation program is recorded according to claim 17, further comprising:

calculating the first suitability by multiplying the non-hiding rate by the gazing point angle evaluation value of the object at the position.

19. The non-transitory computer readable recording medium in which the appearance presentation program is recorded according to claim 15, further comprising:

calculating a non-hiding rate that is a rate of a part of the object to be monitored to the whole of the object to be monitored in the third image, the part being included in the third image and not being covered with an obstacle;

acquiring a resolution of the object to be monitored in the third image;

calculating a resolution evaluation value at a position of the object to be monitored in the region to be monitored by evaluating the resolution with a resolution evaluating function that determines a relationship between the resolution and the resolution evaluation value indicating a suitability for the third image recognition;

calculating a second suitability indicating a suitability of the third image of the object to be monitored at the position for the third image recognition based on the resolution evaluation value and the non-hiding rate; and displaying the resolution and the second suitability on the display device.

20. The non-transitory computer readable recording medium in which the appearance presentation program is recorded according to claim 15, further comprising:

displaying the non-hiding rate on the display device.

\* \* \* \* \*